(12) United States Patent
Guidolin et al.

(10) Patent No.: US 10,675,706 B2
(45) Date of Patent: Jun. 9, 2020

(54) CUTTING APPARATUS FOR CUTTING FLEXIBLE MATERIAL WITH A FIRST CUTTING UNIT AND A SECOND CUTTING UNIT COMPRISING AT LEAST ONE LASER EMITTER

(71) Applicant: GUIDOLIN GIROTTO S.R.L., Vigevano (PV) (IT)

(72) Inventors: Davide Tranquillo Guidolin, Vigevano (IT); Daniela Girotto, Vigevano (IT)

(73) Assignee: GUIDOLIN GIROTTO S.R.L., Vigevano (IT)

( * ) Notice: Subject to any disclaimer, the term of this patent is extended or adjusted under 35 U.S.C. 154(b) by 741 days.

(21) Appl. No.: 15/308,277

(22) PCT Filed: Apr. 14, 2015

(86) PCT No.: PCT/IB2015/052703
§ 371 (c)(1),
(2) Date: Nov. 1, 2016

(87) PCT Pub. No.: WO2015/170206
PCT Pub. Date: Nov. 12, 2015

(65) Prior Publication Data
US 2017/0057006 A1 Mar. 2, 2017

(30) Foreign Application Priority Data

May 9, 2014 (IT) .............................. MI2014A0848

(51) Int. Cl.
*B23K 26/00* (2014.01)
*B23K 26/08* (2014.01)
(Continued)

(52) U.S. Cl.
CPC ........ *B23K 26/0093* (2013.01); *B23K 26/082* (2015.10); *B23K 26/0846* (2013.01);
(Continued)

(58) Field of Classification Search
CPC .............. B23K 26/0093; B23K 26/082; B23K 26/0846; B23K 26/38; B23K 2101/16;
(Continued)

(56) References Cited

U.S. PATENT DOCUMENTS 4,654,505 A * 3/1987 Sciaky ................. B23K 26/067
219/121.63
5,229,571 A * 7/1993 Neiheisel ............... B23K 26/10
219/121.63
(Continued)

FOREIGN PATENT DOCUMENTS

| JP | 2004 351559 A | 12/2004 |
| JP | 2013 152456 A | 8/2013 |
| WO | 2013/081040 A1 | 6/2013 |

*Primary Examiner* — Viet Le
(74) *Attorney, Agent, or Firm* — Pearne & Gordon LLP

(57) ABSTRACT

The present application relates to an apparatus for cutting flexible material. This cutting apparatus comprises: a feed line of a flexible material (2), feeding means (8) for feeding each layer (9, 10, 11, 12) so as to couple said layers (9, 10, 11, 12) to each other along the line of feed and to define said material (2), a first cutting unit (13), arranged on the feeding line, to carry out a first shaping process on said material (2), and a second cutting unit (14), arranged on the feeding line (6) downstream of said first cutting unit (13), to carry out a second shaping process on said shaped material (2). Said second cutting unit (14) has at least a laser emitter (16) to carry out finishing work on the material (2) shaped in the first cutting unit (13).

9 Claims, 4 Drawing Sheets

(51) Int. Cl.
  *B23K 26/38* (2014.01)
  *B23K 26/082* (2014.01)
  *B26F 1/38* (2006.01)
  *B31D 1/02* (2006.01)
  B23K 101/16 (2006.01)
  B26D 9/00 (2006.01)
  B26F 1/40 (2006.01)

(52) U.S. Cl.
  CPC ............... *B23K 26/38* (2013.01); *B26F 1/38* (2013.01); *B31D 1/026* (2013.01); B23K 2101/16 (2018.08); B26D 9/00 (2013.01); B26F 1/40 (2013.01); B26F 2210/00 (2013.01)

(58) Field of Classification Search
  CPC .......... B26F 1/38; B26F 1/40; B26F 2210/00; B31D 1/026; B26D 9/00
  See application file for complete search history.

(56) References Cited

U.S. PATENT DOCUMENTS

| | | | | |
|---|---|---|---|---|
| 5,481,083 A * | 1/1996 | Smyth, Jr. | ............ | B23K 26/0838 219/121.67 |
| 5,635,086 A * | 6/1997 | Warren, Jr. | ............ | B23K 10/00 219/121.39 |
| 6,222,155 B1 * | 4/2001 | Blackmon | ............ | B23K 7/002 219/121.39 |
| 6,337,464 B1 * | 1/2002 | Takaoka | ............ | B23K 26/0093 219/121.65 |
| 6,413,035 B1 * | 7/2002 | Kaneko | ............ | B23K 26/0838 414/222.07 |
| 6,440,254 B1 * | 8/2002 | Rich | ............ | B29C 66/002 156/272.2 |
| 6,455,806 B1 * | 9/2002 | Jendick | ............ | B21O 51/005 219/121.68 |
| 6,563,078 B1 * | 5/2003 | Momany | ............ | B23K 26/0846 219/121.67 |
| 6,825,438 B1 * | 11/2004 | Schadler | ............ | B23K 26/10 219/121.64 |
| 7,045,740 B2 * | 5/2006 | Leibinger | ............ | B23K 26/0884 219/121.82 |
| 7,161,114 B2 * | 1/2007 | Zeygerman | ............ | B23K 26/10 219/121.6 |
| 7,759,608 B2 * | 7/2010 | LeMasson | ............ | B23K 26/702 219/121.67 |
| 7,910,857 B2 * | 3/2011 | Gattiglio | ............ | B23K 26/08 219/121.78 |
| 8,490,268 B2 * | 7/2013 | Pluss | ............ | B23K 26/0838 29/412 |
| 8,492,677 B2 * | 7/2013 | Caristan | ............ | B23K 26/0838 219/121.72 |
| 9,266,199 B2 * | 2/2016 | Fox | ............ | B23K 37/0408 |
| 2001/0017291 A1 * | 8/2001 | Bishop | ............ | B23K 26/032 219/121.63 |
| 2008/0196643 A1 * | 8/2008 | Cartabbia | ............ | A41D 27/24 112/2 |
| 2015/0367444 A1 * | 12/2015 | Abramov | ............ | B23K 37/0235 65/112 |

* cited by examiner

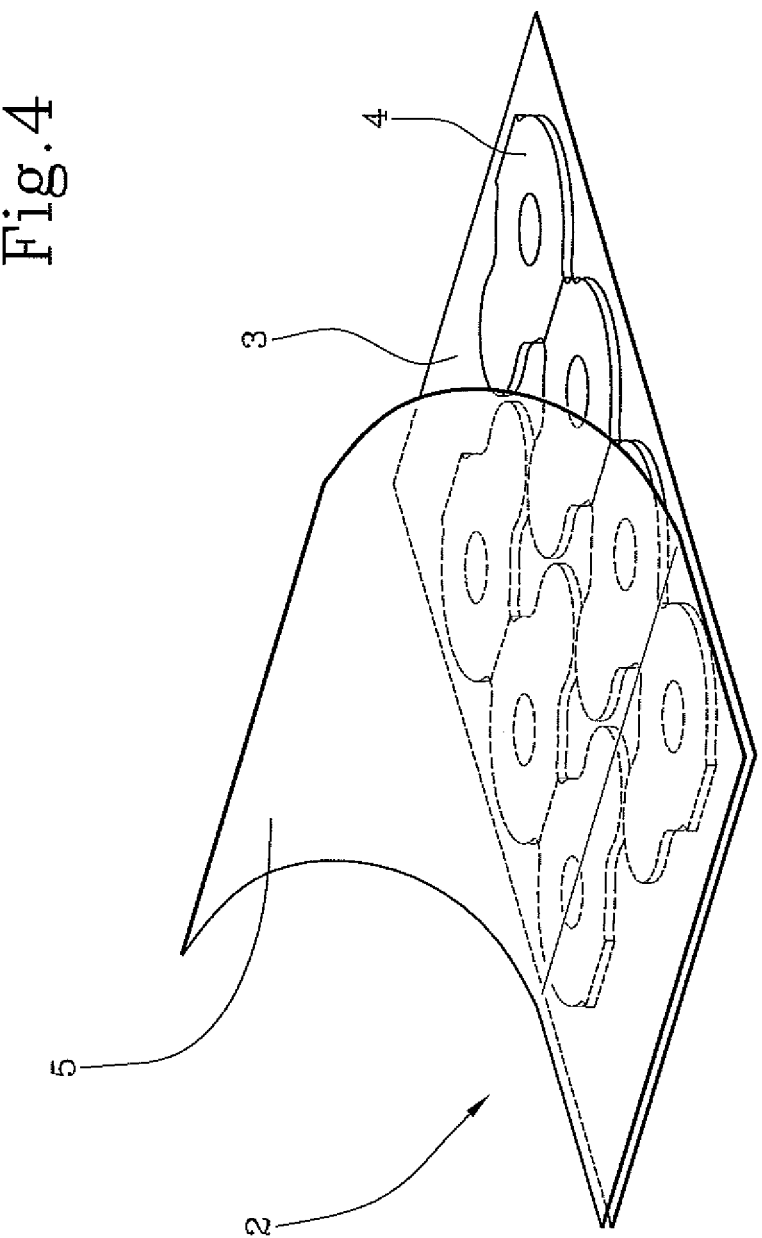

CUTTING APPARATUS FOR CUTTING FLEXIBLE MATERIAL WITH A FIRST CUTTING UNIT AND A SECOND CUTTING UNIT COMPRISING AT LEAST ONE LASER EMITTER

The present invention refers to an apparatus for cutting flexible material. In particular, the present invention finds particular use for shaping flexible, non-adhesive and adhesive materials, in order to impart the shape to such materials generally used as seals, labels or emblems used in the electronics, medical, automotive, etc. industries.

Such materials generally have a sheet configuration, constituted by a first base layer of paper on which one or more layers are superimposed making up the finished product.

As known, the cutting apparatus are mostly constituted by flatbed die-cutters, capable of shaping the flexible material advancing along a respective feeding line.

Along this feeding line, various layers are coupled to the base layer that will compose the finished product, and any scrap portion (swarf) obtained as a result of the cutting procedure are removed.

Along the feeding line there is the cutting device constituted by the die and by respective movement members of the die itself.

The die is moved along a direction perpendicular to the feeding direction (typically vertically) of the material, to penetrate into the layer to be shaped and to perform the respective cutting procedure.

Therefore, once the body zone to be shaped is positioned below the die, the movement members provide for the approaching and subsequently the removing of the knife assembly (die) from the material to define the required shape.

Downstream of the cutting device there are the aforementioned systems for removing the swarf or other continuous coupling/decoupling devices for surface materials to be associated/disassociated to/from the die-cut material.

At the end of the feeding line, the die-cut material can be cut into lengths defining the finished product, or it can be rewound in a roll.

The above-described known cutting apparatus suffers from some technical limitations, especially with reference to carrying out precision cuts and shapes, as determined by holes or cuts having very small size, which therefore require a cutting/finishing procedure on the die-cut material.

To overcome these limits, there are provided further systems for laser cutting, in which the flexible material, once die-cut in the traditional flatbed die-cutters, it is transported to a laser cutting machine.

This operation comprises the finishing of the body, which is already die-cut and coupled with all the layers needed to define the final product, in such laser machines, which allow obtaining very small cuts and holes or precision operations that are not possible to be obtained by means of knife cutting systems.

However, even this solution suffers from important drawbacks related to the timing of realization of the finished product that must be fed in two different machines, i.e., the flatbed die-cutter and subsequently the cutting laser device.

Furthermore, this system proves to be laborious and therefore disadvantageous in economic terms, because of the need of the transfer of the die-cut material, the possible preparation of it at the inlet of the laser cutting device, and the subsequent reassembling of the finished product.

A last important drawback is derived from the overall dimensions of the system that provides for two separate machines for obtaining a single product.

Given the above, the Applicant has posed the problem of providing a single unit suitable for any type of cut of the flexible material.

The object of the present invention is therefore to provide an apparatus for cutting flexible material, which is versatile and able to achieve finishing workings, cuts and shapes very small in size.

Furthermore, object of the present invention is also to provide a cutting apparatus which is structurally simple, and having very reduced size and processing times.

The above-mentioned objects are achieved by an apparatus for cutting flexible material as described in claim 1.

Further characteristics and advantages will become more apparent from the detailed description of some preferred but not limitative embodiments of an apparatus for cutting flexible material according to the present invention.

Such a description will be set forth hereinafter with reference to the accompanying drawings given only for illustrative purposes and not by way of limitation, in which:

FIG. 4 shows a perspective and schematic view of a length of flexible material obtained by the apparatus according to the present invention.

Figure 1:
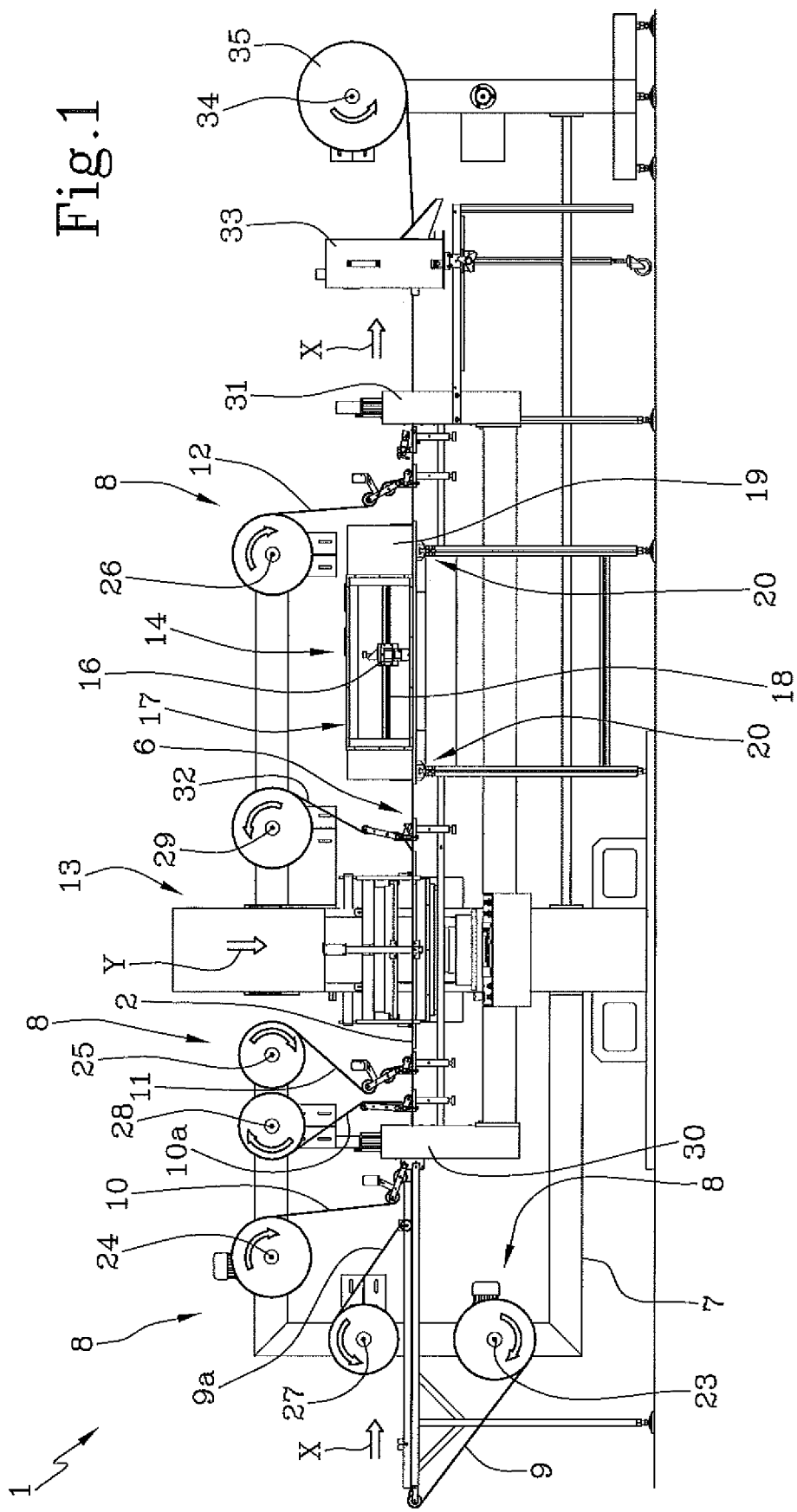
FIG. 1 shows a schematic side view of an apparatus for cutting flexible material, according to the present invention and in a respective operating condition.

With reference to the attached figures, the numeral 1 generally refers to an apparatus for cutting flexible material 2.

In particular, as is better illustrated in FIG. 4, the machine according to the present invention is employed in particular for the realization of products used as labels, seals, writings and drawings to be applied to surfaces of various kinds. These products are supported by a base sheet and generally have a thickness between 0.1 and 20 mm.

In FIG. 4 a flexible material 2 consists of a base sheet 3 on which rubber elements 4 suitably die-cut are coupled, is illustrated purely by way of example and without limitation. From the opposite side of the base sheet 3 a transparent protective layer 5 is applied.

It should be specified that the typology, the structure, the number of layers, and the shape of the material to be shaped may be different according to the various production needs.

Figure 2:
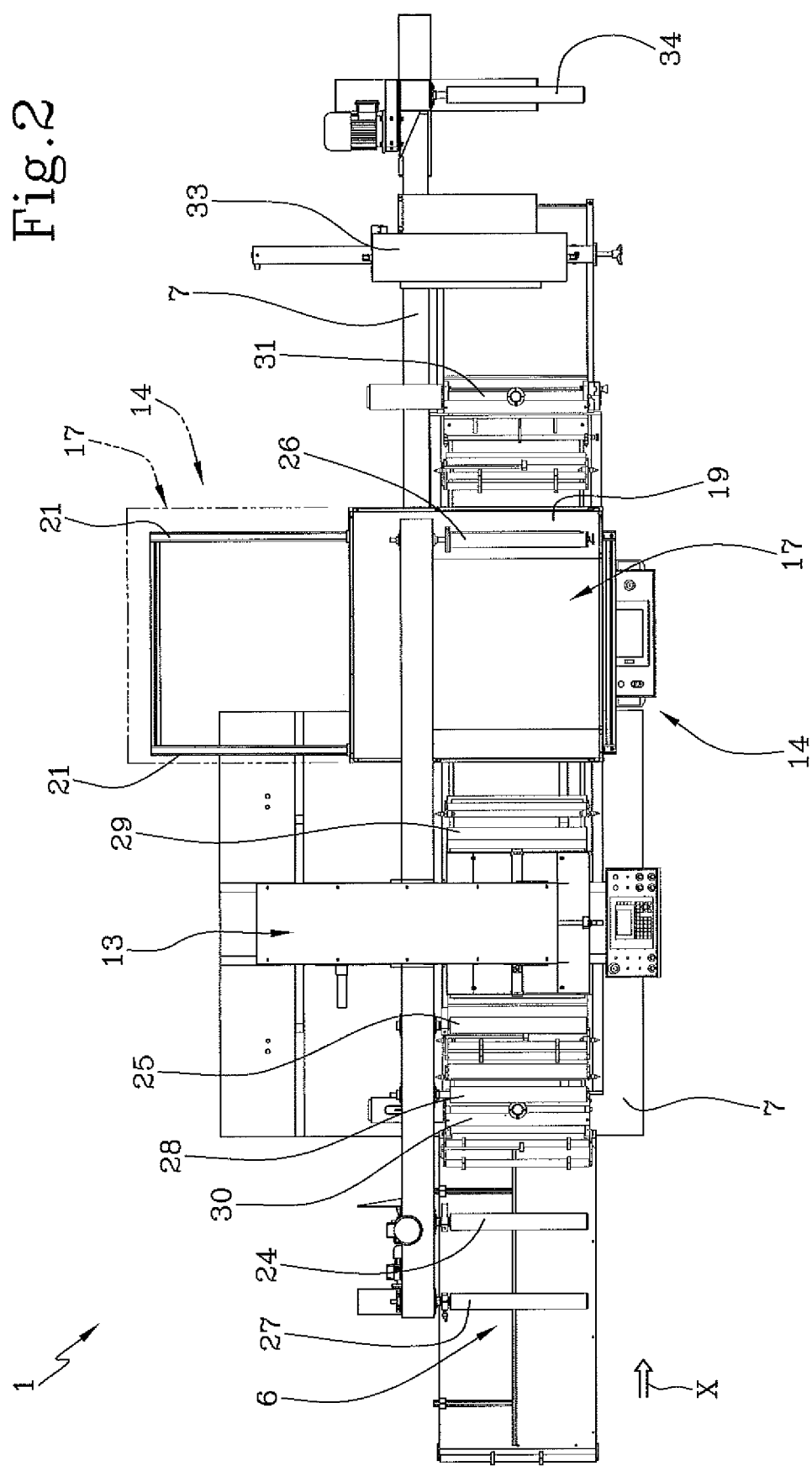
FIG. 2 shows a top plan view of the apparatus of FIG. 1 in a non-operating condition.

With reference to FIGS. 1 and 2, the apparatus 1 comprising a feed line 6 for the flexible material 2 suitably formed on a support frame 7 of the apparatus 1 itself.

The feeding line is defined by suitable systems for feeding the material 2 inside the machine consists of a continuous strip. Such feeding systems, not described and illustrated in detail since of known type, provide for the continuous or stepped feeding of the material 2 according to the various cutting operations.

More particularly, the apparatus 1 has feeding means 8 for feeding each layer 9, 10, 11, 12, which are coupled to the frame 7, so as to couple said layers to each other along the feed line 6 to define said flexible material 2.

In FIG. 1 four layers 9, 10, 11 and 12, that are coupled along the line 6 to define the material 2, are illustrated purely by way of example and without limitation.

Also in this case, it should however be specified that the number of layers may be different according to the type of material 2. Consequently, as will be better specified hereinafter, the use of the feeding means 8 also can vary depending on the number of layers provided.

The apparatus 1 further comprises a first cutting unit 13, arranged on the feed line 6, to implement a first shaping process on the material 2, and a second cutting unit 14, arranged on the feed line 6 downstream of the first cutting unit 13, to carry out a second shaping process on the material 2 previously worked from the first unit 13.

Preferably, the first cutting unit 13 is constituted by a flatbed die-cutter having at least one cutting blade 15 (the die) that is movable along a direction (Y) perpendicular to the direction of feed (X) of the feed line 6.

The cutting blade 15 is moved by suitable motor means (not described since of known type), between a lowered state, wherein it cuts the material 2 and a raised state, wherein it is moved away from the material 2 upon completion of the cutting procedure.

To implement this first cutting operation, the feeding of the material 2 is stopped at the first cutting unit 13 to allow the action of the blade 15 on the material 2.

Advantageously, the second cutting unit 14 comprises at least one laser emitter 16 to carry out finishing work on the material 2 shaped in the first cutting unit 13.

Preferably, the second cutting unit 14 consists of a laser plotter 117 comprising the above-mentioned laser emitter 16 supported by movement means 18 for moving the laser emitter 16 so as to orient a laser beam according to the zones to be shaped and the type of cutting work to be performed on the material.

The movement means 18 are constituted by a pair of guides, not described and illustrated in detail. These guides are perpendicular to each other and allow the movement of the emitter 16 in any area defined by the second cutting unit 14. Moreover, the means 18 allow rotating the emitter 16 to allow cuts on the material 2 with angles of incidence, which vary according to the various requirements.

Advantageously, the laser plotter 17 allows realizing complex figures for high-precision cutting work also on demanding materials in terms of composition and process.

In fact, the laser cutting allows to realize, for example, small and multiple holes on thicknesses that exceed one millimetre on an adhesive mass or gel, very complex shapes with very close blade distances, special hole tabloid on different types of materials.

Furthermore, the cutting procedure can be performed during a stepped feeding of a material 2 at the same time of the cutting procedure by the die 15, or during a continuous feeding without stopping the feeding of the material 2.

The second cutting unit 14 further comprises a supporting frame 19 and a movement member 20, associated with the frame 19, to move the second cutting unit 14 between an operational state, wherein the emitter 16 is at the feed line 6, and a non-operational state, wherein the emitter is not at the feed line 6.

Figure 3B:
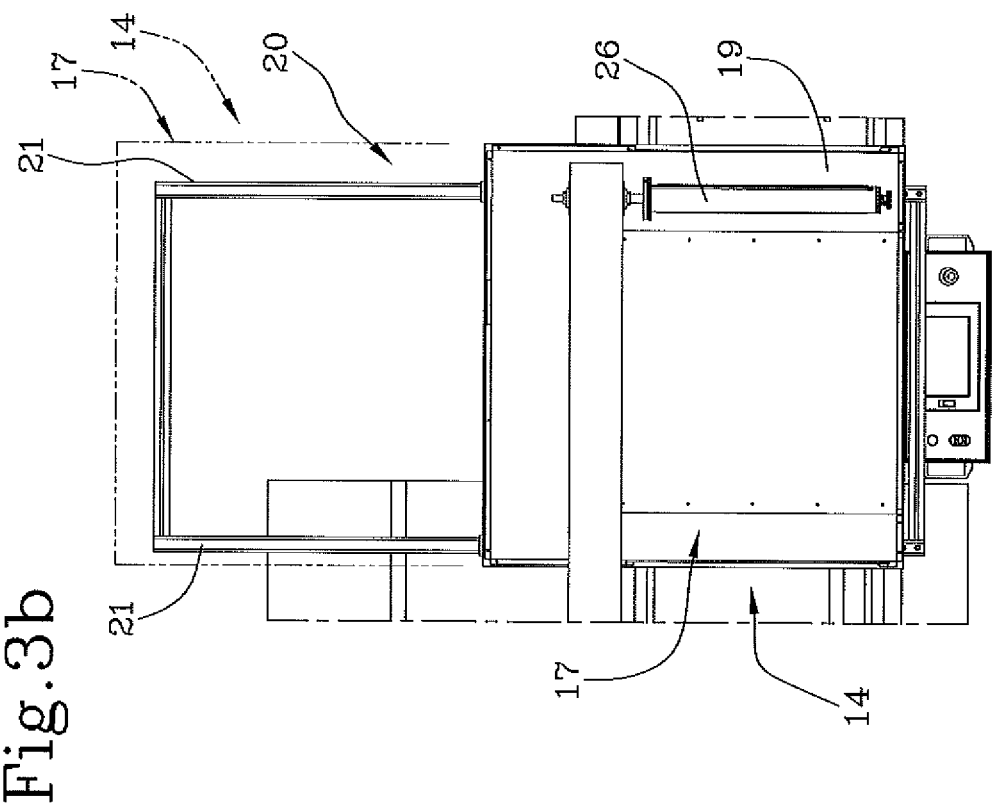
FIGS. 3a and 3b show enlarged views of a same technical detail of the apparatus illustrated in FIGS. 1 and 2, respectively.

In particular, with reference to the enlarged view of FIG. 3b, the movement member 20 moves (manually or by using suitable automatic actuators) the entire second cutting unit 14 in a not working state (dashed line). In this situation, the action of the plotter 17 is excluded in order to use the apparatus as a traditional flatbed die-cutter, or vice versa.

In greater detail, the movement member 20 of the second cutting unit 14 comprises at least one slide guide 21, extending transversely to the development of the feed line 6.

Preferably, there are provided two sliding guides 21 parallel to each other, supported by the support frame 7 and perpendicular to the "X" direction of feed line 6.

Figure 3A:
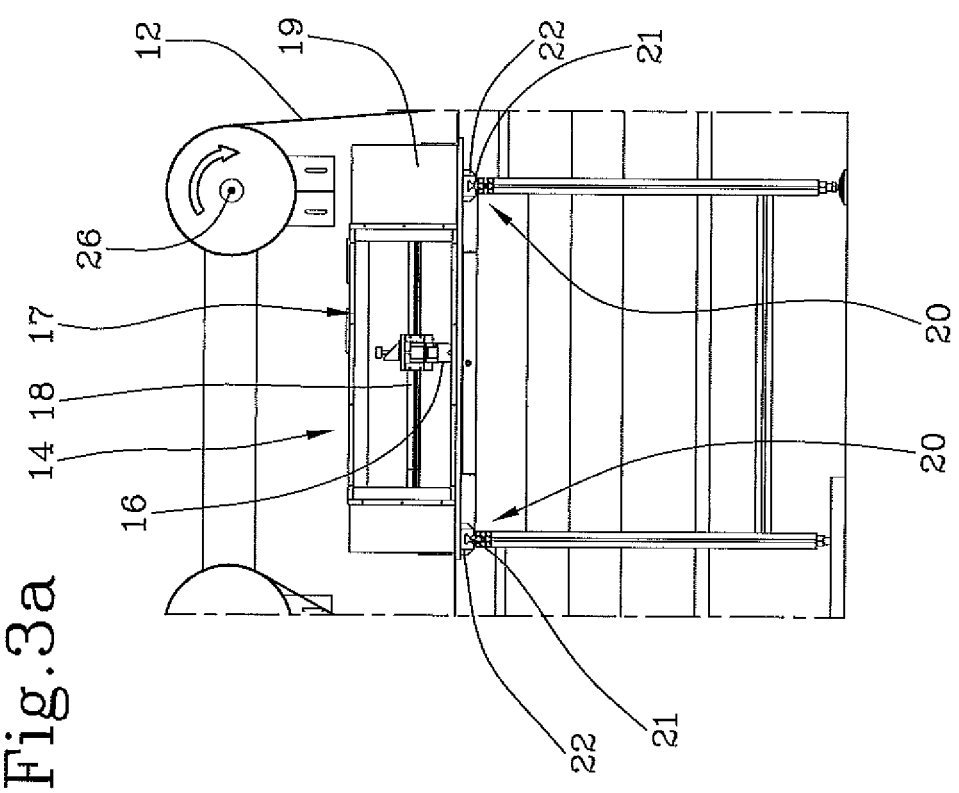

As better shown in the enlarged view of FIG. 3a, the frame 19 of the second cutting unit 14 has a pair of guide shoes 22 that are slidably associated with respective guides 21 to move the frame 19 and all of the second cutting unit 14 in the operational and non-operational states.

With reference to the FIGS. 1 and 2, note that said feeding means 8 for feeding each layer 9, 10, 11, 12 comprises a plurality of feed rollers 23, 24, 25, 26 arranged along the feed line 6 upstream of the first cutting unit 13 and/or downstream of the second cutting unit 14 and/or between the first and second cutting units 13, 14.

In particular, a first feed roller 23 is arranged at an inlet zone of the feed line 6 and is adapted to feed a first layer 9, which, for example, defines the aforementioned base sheet 3.

A second feed roller 24, which is also arranged at the inlet zone of the feed line 6, feeds a second layer 10 on the first layer 9. A lamination device 30 provides to couple the first 9 and the second layer 10 to each other.

Advantageously, between the first and second feed rollers 23, 24 there is a removal first roller 27 for removing at least a surface portion 9a of the first layer 9.

In this way, the surface portion 9a is removed and wound around the first removal roller 27, which can be consisted of a protective liner of the first layer 9.

Located downstream of the second feed roller 24 there is also a second removal roller 28 for removing at least a surface portion 10a of the second layer 10.

In this way, the surface portion 10a is removed and wound around the second removal roller 28, which can be consisted of a protective liner of the second layer 10.

Between the second removal roller 28 of the first cutting unit 13 there is also a third feed roller 25 for feeding a third layer 11 above the second layer 10 whose surface portion 10a has been removed.

The third layer 11 can be consisted, for example, of a silicone paper covering the adhesive surface of the second layer 10.

Finally, a fourth feed roller 26 is arranged downstream of the second cutting unit 14 for coupling a fourth layer 12 with the finished material 2 (suitably shaped by the cutting units 13 and 14). A lamination device 31 arranged downstream of the fourth feed roller 26 provides to couple the fourth layer 12 on the third layer 11.

The fourth layer 12 can be consisted, for example, of a protection adhesive paper for the shaped layers 10, 11.

The apparatus 1 further comprises at least one removal roller 29 for removing a portion of scrap 32 obtained because of the first shaping procedure.

The removal roller 29 is arranged along the feed line 6 downstream of the first cutting unit 13 and provides to remove and wind on itself the swarf generated by the cutting by the die 16.

In this way, the material 2 enters the second cutting unit 14 having a partial cut work.

Furthermore, the apparatus 1 comprises a guillotine element 33 being arranged in an exit zone of the feed line 6 downstream of the second cutting unit 14. The guillotine element 33 has a cutting blade (not shown since of known type) to separate the material 2 into lengths of finished products (FIG. 4).

Alternatively, it can be provided a winding device 34, being arranged in an exit zone of the feed line 6 downstream of the second cutting unit 14 to wind the material 2 in a roll 35 of finished products.

The present invention provides important advantages.

In fact, the coupling of the two types of cutting devices, i.e., the flatbed die-cutter and laser plotters, incorporated in a single device significantly reduces the timing required for the conventional processes.

This advantage is derived from the fact that the material 2 is fed continuously along a single feed line 6 at the first cutting unit, which realizes larger shapes, and subsequently at the second cutting unit 14, which perform finishing work by removal of material.

In one process, it is thus possible to make products with particular shapes, such as bevels on the edge of the material 2, or cuts and holes having reduced size of about 0.1 mm.

In addition, the coupling in a single device of the two cutting technologies allows obtaining an apparatus with very limited dimensions.

Finally, the apparatus 1 is extremely versatile and adaptable to any type of process and material to be shaped.

This flexibility is given by the presence of alternating feed and removal rollers, for feeding and removing the layers, housed along the feed line 6, both upstream and downstream of the cutting units.

The number and arrangement of the rollers can therefore be determined according to the product to be shaped.

Moreover, the possibility to exclude the second cutting units 14 from the feed line 6 also allows using the apparatus only for the traditional die cutting.

The invention claimed is:

1. A cutting apparatus for cutting flexible material, comprising:
   a feed line (6) for feeding a flexible material (2);
   feeding means (8) for feeding a plurality of layers (9, 10, 11, 12) so as to couple said layers to each other along the feed line (6) and to define said material (2);
   a first cutting unit (13), arranged on the feed line (6), to carry out a first shaping process on said material (2); and
   a second cutting unit (14), arranged on the feed line (6) downstream of said first cutting unit (13), to carry out a second shaping process on said shaped material (2);
   said second cutting unit (14) comprising at least one laser emitter (16) having a laser plotter (17) or a galvanometric plotter to carry out finishing work on the material (2) shaped in the first cutting unit (13);
   said first cutting unit (13) comprising a flatbed die-cutter comprising at least one cutting blade (15) that is movable along a direction (Y) perpendicular to the direction of feed (X) of the feed line (6) between a lowered state, wherein it cuts the material (2), and a raised state wherein it is moved away from the material (2) upon completion of the cutting procedure.

2. The apparatus according to claim 1, characterized in that said second cutting unit (14) comprises movement means (18) for moving the laser emitter (16) so as to orient a laser beam according to the zones to be shaped and the type of cutting work to be performed on the material (2).

3. The apparatus according to claim 1, characterized in that said second cutting unit (14) further comprises a supporting frame (19) and a movement member (20) for moving the second cutting unit (14) and associated with said frame (19) so as to move the second cutting unit (14) between an operational state, wherein the emitter (16) is at the feed line, and a non-operational state, wherein the emitter (16) is not at the feed line (6).

4. The apparatus according to claim 3, characterized in that said movement member (20) for moving the second cutting unit (14) comprises at least one slide guide (21) extending transversely to the feed line (6); said frame (19) having at least one guide shoe (22) that is slidably associated with the guide (21) so as to slide the frame (19) on the guide (21) between said operational and non-operational states.

5. The apparatus according to claim 1, characterized in that it further comprises a guillotine element (33) to separate the material (2) into lengths of finished products, said guillotine element (33) being arranged in an exit zone of the feed line (6) downstream of the second cutting unit (14).

6. The apparatus according to claim 1, characterized in that it further comprises a winding device (34) to wind the material (2) in a roll (35) of finished products, said winding device (34) being arranged in an exit zone of the feed line (6) downstream of the second cutting unit (14).

7. The apparatus according to claim 1, characterized in that said feeding means (8) for feeding each layer comprises a plurality of feed rollers (23, 24, 25, 26) arranged along the feed line (6) upstream of the first cutting unit (13) and/or downstream of the second cutting unit (14) and/or between the first and second cutting units (13, 14), each roller (23, 24, 25, 26) supplying a respective layer (9, 10, 11, 12).

8. The apparatus according to claim 1, characterized in that it further comprises at least one removal roller (27, 28) for removal of at least one surface portion (9a, 10a) of a respective layer (9, 10); said removal roller (27, 28) being arranged along the feed line (6).

9. The apparatus according to claim 1, characterized in that it further comprises at least one removal roller (29) for removal of a scrap portion (32) of the material (2), said scrap portion resulting from the first shaping process and said roller being arranged along the feed line (6) downstream of the first cutting unit (13).

* * * * *